US012564798B2

(12) United States Patent
Rhu et al.

(10) Patent No.: US 12,564,798 B2
(45) Date of Patent: Mar. 3, 2026

(54) SEDIMENTATION TANK SYSTEM INCLUDING HIGH-RATE FILTRATION PART AND CAPABLE OF PRIMARY TREATMENT OF SEWAGE AND WASTEWATER, FLOW EQUALIZATION, AND TREATMENT OF WET WEATHER FLOW

(71) Applicant: TOMORROW WATER, Anaheim, CA (US)

(72) Inventors: Dae Hwan Rhu, Gyeonggi-do (KR); Bong Choel Choi, Daejeon (KR)

(73) Assignee: TOMORROW WATER, Anaheim, CA (US)

( * ) Notice: Subject to any disclaimer, the term of this patent is extended or adjusted under 35 U.S.C. 154(b) by 321 days.

(21) Appl. No.: 18/222,268

(22) Filed: Jul. 14, 2023

(65) Prior Publication Data

US 2023/0372843 A1 Nov. 23, 2023

Related U.S. Application Data

(63) Continuation of application No. PCT/KR2021/016603, filed on Nov. 15, 2021.

(30) Foreign Application Priority Data

Jan. 15, 2021 (KR) ........................ 10-2021-0006078

(51) Int. Cl.
*B01D 21/02* (2006.01)
*B01D 21/24* (2006.01)
*B01D 21/34* (2006.01)

(52) U.S. Cl.
CPC ......... *B01D 21/2405* (2013.01); *B01D 21/02* (2013.01); *B01D 21/34* (2013.01)

(58) Field of Classification Search
CPC ................ B01D 21/0012; B01D 21/02; B01D 21/2405; B01D 21/34; C02F 2209/40
See application file for complete search history.

(56) References Cited

U.S. PATENT DOCUMENTS

2003/0106859 A1 6/2003 Miyata et al.

FOREIGN PATENT DOCUMENTS

CN 111285546 A 6/2020
KR 10-2005-0028899 A 3/2005
(Continued)

OTHER PUBLICATIONS

Wang, Li-qun et al—CN 11285546 A machine tranlsation—Jun. 16, 2020 (Year: 2020).*

(Continued)

*Primary Examiner* — Bradley R Spies
(74) *Attorney, Agent, or Firm* — Dinsmore & Shohl LLP; Yongsok Choi, Esq.

(57) ABSTRACT

Disclosed is a sedimentation tank system including high-rate filtration part and being capable of primary treatment of sewage and wastewater, flow rate adjustment, and treatment of wetweather flow. According to an aspect of the present disclosure, there is provided a sedimentation tank system for removing solids in an influent sewage and wastewater, the sedimentation tank including a filtration part which includes a filter medium and removes solids in the influent sewage and wastewater, a sedimentation tank with a water gate formed at a predetermined height to store sewage and wastewater flowing over the water gate, and an outflow distribution channel that receives, from the filtration part, sewage and wastewater from which solids have been removed, and discharges the same to the outside of the primary sedimentation tank.

12 Claims, 11 Drawing Sheets

239

(56)     References Cited

FOREIGN PATENT DOCUMENTS

| | | | |
|---|---|---|---|
| KR | 10-2005-0080107 | A | 8/2005 |
| KR | 10-2010-0123189 | A | 11/2010 |
| KR | 101003477 | B1 | 12/2010 |
| KR | 10-2013-0134079 | A | 12/2013 |
| KR | 10-2199644 | B1 | 1/2021 |

OTHER PUBLICATIONS

Chung, Kyeong Jin—KR 20050028899 A machine translation—Mar. 23, 2005 (Year: 2005).*

* cited by examiner

<u>100</u>

110 primary sedimentation tank system

120 bioreactor tank

SEDIMENTATION TANK SYSTEM INCLUDING HIGH-RATE FILTRATION PART AND CAPABLE OF PRIMARY TREATMENT OF SEWAGE AND WASTEWATER, FLOW EQUALIZATION, AND TREATMENT OF WET WEATHER FLOW

CROSS-REFERENCE TO RELATED APPLICATIONS

This patent application is a continuation of International Application No. PCT/KR2021/016603 which claims priority under 35 U.S.C. § 119(a) of the United States Patent Act to Korean Patent Application No. 10-2021-0006078 filed with Korean Intellectual Property Office on Jan. 15, 2021, the disclosure of which is incorporated herein by reference in its entirety.

TECHNICAL FIELD

The present disclosure relates to a primary sedimentation tank including high-rate filtration part and capable of primary treatment of sewage and wastewater, flow equalization, and treatment of wetweather flow.

BACKGROUND ART

The contents described in this section merely provide background information about the present embodiment, and do not constitute the prior art.

Examples of contaminants present in sewage and wastewater include solids, organic matters, as well as nutrient salts such as nitrogen and phosphorus. Physical, biological, and chemical methods are used to remove these contaminants.

The primary treatment is performed by an apparatus for removing solids present in sewage and wastewater, while most of the solids are physically settled due to their weights. In the conventional primary sedimentation process, by leaving sewage and wastewater in a tank having a certain volume for a certain period of time, a material having a specific gravity greater than water and present in the sewage and wastewater is settled onto the bottom of a sedimentation tank. Solids that have reached the bottom of the sedimentation tank are removed by being discharged out of the sedimentation tank by scraper and pump.

Conventional primary sedimentation tanks have operated at a surface loading rate of 1 to 2 m/hr or less and a lateral speed of 0.3 m/sec or less to prevent sludge from re-floating. Thus, the conventional primary sedimentation tank has the inconvenience of having a hydraulic retention time of 2 to 4 hours or more in order to sediment solids in the sewage and wastewater. Because of this, the conventional primary sedimentation tank has occupied a large proportion of about 10 to 20% of the site of the sewage treatment plant for removing organic matters.

In addition, the sewage and wastewater are first treated in the primary sedimentation tank, and then introduced into a bioreactor tank. The bioreactor tank removes contaminants by biologically treating the introduced sewage and wastewater using microorganisms. Since the bioreactor tank is sensitive to the load amount of sewage and wastewater, such as the flow rate of the influent sewage and wastewater and the concentration of contaminants in the sewage and wastewater, a change in the load amount may cause a change in the reaction rate of microorganisms. For this reason, in a conventional sewage and wastewater treatment plant, a equalization tank has been installed at the front end of the bioreactor tank to adjust the flow rate of sewage and wastewater to be introduced into the bioreactor tank. However, since such equalization tank should store several times the flow rate to be treated in the bioreactor tank, it needs a huge space.

SUMMARY OF INVENTION

Technical Problem

One embodiment of the present disclosure is to provide a sedimentation tank system capable of high-rate filtration, primarily treating contaminants, and controlling the flow rate of influent sewage and wastewater while treating sewage and wastewater of a certain load amount or more.
[Solution to Problem]

According to an aspect of the present disclosure, there is provided a sedimentation tank for removing solids in an influent sewage and wastewater, the sedimentation tank system including a filtration part which includes a filter medium and removes solids in the influent sewage and wastewater, a sedimentation tank with a water gate formed at a predetermined height to store sewage and wastewater flowing over the water gate, and an outflow distribution channel that receives, from the filtration part, sewage and wastewater from which solids have been removed, and discharges the same to the outside of the primary sedimentation tank.

According to an aspect of the present disclosure, the sedimentation tank system further includes a pump station which pumps the influent sewage and wastewater, causing the same to flow into the filtration part.

According to an aspect of the present disclosure, the sedimentation tank system further includes a flow rate adjustment pipe for inflow and outflow of sewage and wastewater between the pump station and the sedimentation tank.

According to an aspect of the present disclosure, the flow rate adjustment pipe connects the lower end of the sedimentation tank and the pump station to enable the inflow and outflow of sewage and wastewater between the pump station and the sedimentation tank.

According to an aspect of the present disclosure, the sedimentation tank system further includes a control part that controls the operation of each component in the sedimentation tank and controls the operation of the water gate or the outflow distribution channel by perceiving a load amount of sewage and wastewater flowing into the sedimentation tank.

According to an aspect of the present disclosure, the filtration part includes a plurality of filtration tanks which include the filter medium and remove solids in the influent sewage and wastewater using the filter medium.

According to an aspect of the present disclosure, the control part controls one filtration tank in the filtration part to backwash the filter medium using sewage and wastewater from which solids have been removed.

According to an aspect of the present disclosure, the primary sedimentation tank further includes a sludge thickening tank which receives the backwashing water that has been backwashed from the filter medium, and which filters out solids in the backwashing water through sedimentation thereof.

According to an aspect of the present disclosure, the control part sequentially varies the filtration tanks performing backwashing in the filtration part.

According to an aspect of the present disclosure, the load amount of the sewage and wastewater refers to the flow rate of sewage and wastewater flowing into the primary sedimentation tank or the concentration of contaminants in sewage and wastewater flowing into the primary sedimentation tank.

According to an aspect of the present disclosure, the control part closes the water gate when the load amount of sewage and wastewater is equal to or less than a first upper limit value.

According to an aspect of the present disclosure, the control part opens the water gate to store sewage and wastewater flowing into the sedimentation tank when the load amount of the sewage and wastewater exceeds a first upper limit value and is less than or equal to a second upper limit value.

According to an aspect of the present disclosure, the sewage and wastewater stored in the sedimentation tank flows into the pump station from the sedimentation tank along the flow rate adjustment pipe when the water level of the sewage and wastewater in the pump station is lowered.

According to an aspect of the present disclosure, when the load amount of the sewage and wastewater exceeds a second upper limit value, the control part opens the water gate and shuts off the flow rate adjustment pipe so that the sewage and wastewater flows into the sedimentation tank.

According to an aspect of the present disclosure, the sedimentation tank stores introduced sewage and wastewater, separates solids and upper water, and discharges only the upper water.

According to an aspect of the present disclosure, there is provided a primary sedimentation tank for removing solids in an influent sewage and wastewater, the primary sedimentation tank system including a filtration part which includes a filter medium and removes solids in the influent sewage and wastewater, a pump station which pumps the influent sewage and wastewater, causing the same to flow into the filtration part, an inflow distribution channel for delivering the sewage and wastewater flowing into the primary sedimentation tank to the pump station, a sedimentation tank with a water gate formed at a predetermined height to store sewage and wastewater flowing over the water gate, a flow rate adjustment pipe which connects the lower end of the sedimentation tank and the pump station and enables the inflow and outflow of sewage and wastewater between the pump station and the sedimentation tank, an outflow distribution channel that receives, from the filtration part, sewage and wastewater from which solids have been removed, and discharges the same to the outside of the primary sedimentation tank, and a control part that controls the operation of each component in the primary sedimentation tank and controls the operation of the water gate or the outflow distribution channel by perceiving a load amount of sewage and wastewater flowing into the primary sedimentation tank.

Advantageous Effects

As described above, according to an aspect of the present disclosure, it has the advantage of being capable of high-rate filtration, primarily treating contaminants, and controlling the flow rate of influent sewage and wastewater, with one structure, while treating sewage and wastewater of a certain load amount or more.

BRIEF DESCRIPTION OF DRAWINGS

FIG. 11 is a graph showing the flow rate of the sewage and wastewater outflowing from a conventional primary sedimentation tank.

FIG. 12 is a graph showing the flow rate of the sewage and wastewater outflowing from a primary sedimentation tank according to an embodiment of the present disclosure.

DETAILED DESCRIPTION

Figures 1, 2:
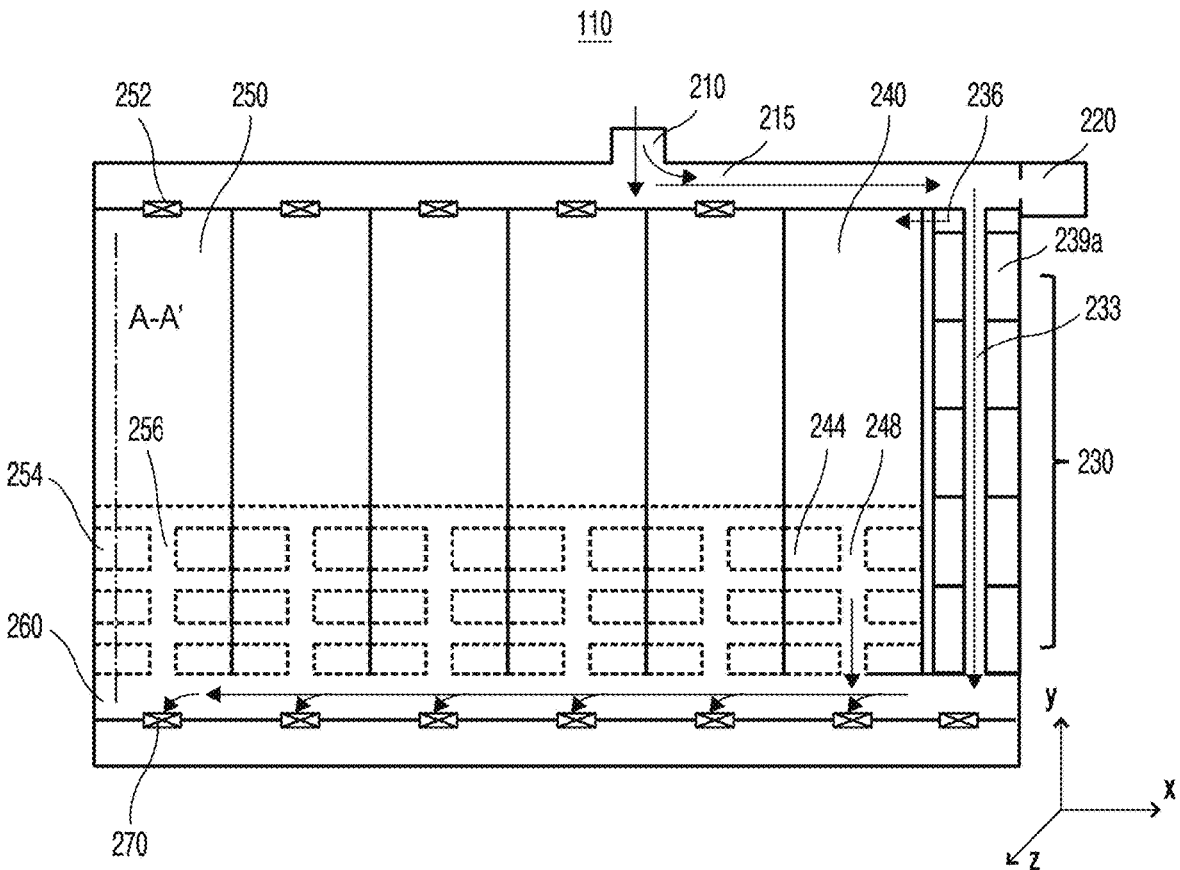
FIG. 1 is a diagram showing an apparatus for treating sewage and wastewater according to an embodiment of the present disclosure.
FIG. 2 is a diagram showing the configuration of the primary sedimentation tank system according to an embodiment of the present disclosure.

While the present disclosure may be susceptible to various modifications and alternative embodiments, specific embodiments thereof have been shown in the drawings by way of example and will now be described in detail. However, this is not intended to limit the present embodiment to a specific form of disclosure, and it should be understood that all changes, equivalents, and substitutes are included in the technical idea and scope of the present disclosure. At the time of describing respective drawings, like reference numerals have been used for like components.

Though terms, such as first, second, A, B, and the like, may be used to explain various components, the components should not be limited by the terms. Said terms are used in order only to distinguish one component from another component. For example, without departing from the scope of the disclosure, the first component can be designated as a power means element; similarly the power means element can also be designated as the first component. The term "and/or" includes any and all combinations of a plurality of related listed items or any of the plurality of related listed items.

Further, when one component is referred to as being "connected to" or "coupled to" another element, it should be understood as that the one component may be directly connected or coupled to that other component, or any intervening component may also be present therebetween. Contrarily, when one component is referred to as being "directly connected" or "directly coupled" to another component, it should be understood as that no other element is present therebetween.

The terms used in this application are used to merely describe specific embodiments but are not intended to limit the disclosure. Singular expressions may include the meaning of plural expressions unless the context clearly indicates otherwise. As used in this application, it should be understood that the terms "comprise," "have," and the like do not preclude the possibility of the presence or addition of features, numbers, steps, actions, components, parts stated in the specification, or combinations thereof.

Unless otherwise defined, all terms used herein, including technical or scientific terms, have the same meaning as commonly understood by a person of ordinary skill in the art to which the present disclosure pertains.

Terms as defined in a commonly used dictionary should be interpreted as having a meaning consistent with the meaning in the context of the related technology and are not to be interpreted as an ideal or excessively formal meaning unless explicitly defined in this application.

Additionally, each configuration, process, procedure, method, or the like included in each embodiment of the present disclosure may be combined with each other unless a mutual contradiction arises in a technical context.

FIG. 1 is a diagram showing an apparatus for treating sewage and wastewater according to an embodiment of the present disclosure.

Referring to FIG. 1, the apparatus for treating sewage and wastewater 100 according to an embodiment of the present disclosure includes a primary sedimentation tank system 110 and a bioreactor tank 120. Here, the primary sedimentation tank system 110 is designated because it treats the sewage and wastewater prior to the bioreactor tank but does not necessarily mean the treatment order of the sewage and wastewater (first treatment of sewage and wastewater).

The apparatus for treating sewage and wastewater 100 includes the primary sedimentation tank system 110 and the bioreactor tank 120 to remove solids and contaminants contained in the sewage and wastewater. The primary sedimentation tank system 110 receives sewage and wastewater for the first time and removes solids contained in the sewage and wastewater, and the bioreactor tank 120 receives the sewage and wastewater from which solids have been removed through the primary sedimentation tank, and remove contaminants contained in the sewage and wastewater by performing biological reaction on the sewage and wastewater. In this regard, the contaminants are components that adversely affect the aquatic environment, such as causing eutrophication, when they are discharged without any treatment, and refer to nutritive salts, such as, organic matter, nitrogen, and phosphorus. The bioreactor tank 120 removes these contaminants. The apparatus for treating sewage and wastewater 100 may include an additional configuration for additionally purifying the sewage and wastewater that has passed through the bioreactor tank 120.

In this regard, the primary sedimentation tank system 110 can remove solids contained in sewage and wastewater in a short time unlike the existing ones, while adjusting the flow rate simultaneously so that the treatment can be performed smoothly in the bioreactor tank 120, and can flexibly perform the treatment even when sewage and wastewater with a large load amount, such as a wetweather flow or the sewage and wastewater discharged at a specific time period, is temporarily introduced.

The primary sedimentation tank system 110 can treat the solids within a short time. Unlike the conventional sedimentation tank, the primary sedimentation tank system 110 includes a high-rate filtration part, so that the solids filtration process, which conventionally took several hours, can be performed within a reduced time period which is about 1/20 to 1/10 times of the conventional time period and is a period of time of about several tens of minutes. Accordingly, if the amounts of sewage and wastewater to be treated by the primary sedimentation tank system 110 and the conventional sedimentation tank are the same, the area of the primary sedimentation tank system 110 can be reduced by 1/20 to 1/10 times that of the conventional sedimentation tank. Conversely, if the primary sedimentation tank system 110 has the same area as the conventional sedimentation tank, solids filtration efficiency can be improved by a few times compared to the conventional sedimentation tank.

The primary sedimentation tank system 110 adjusts the flow rate of the sewage and wastewater so that smooth treatment is performed in the bioreactor tank 120, and flexibly treats the sewage and wastewater having a large load amount temporarily. Since the flow rate of sewage and wastewater to be introduced for the optimal treatment by the bioreactor tank 120 is determined, the bioreactor tank 120 can treat the sewage and wastewater at an optimum efficiency only when the corresponding flow rate of sewage and wastewater is periodically introduced. To this end, the apparatus for treating sewage and wastewater 100 adjusts the flow rate using the primary sedimentation tank system 110 without having a separate equalization tank. As described above, the primary sedimentation tank system 110 system may have an area only 1/10 to 1/20 times larger than that of the conventional sedimentation tank for solids treatment. Accordingly, one area of the primary sedimentation tank system 110 is used for filtering solids, and the remaining area of the primary sedimentation tank has the same configuration as a conventional sedimentation tank for flow rate adjustment. When the primary sedimentation tank system 110 has the same area as the conventional sedimentation tank, a part of the area of the primary sedimentation tank may be utilized as a high-rate filtration part, and the remaining area of the primary sedimentation tank may be operated in the form of a conventional sedimentation tank. Accordingly, when a large amount of sewage and wastewater flows into the primary sedimentation tank system 110, the flow rate can be adjusted by storing the rest of the sewage and wastewater to be discharged into the bioreactor tank 120 in the remaining sedimentation tank separately from the filtration of the solids. In addition, when the sewage and wastewater having a higher load amount than the load amount that can be treated by the high-rate filtration part is introduced temporarily, the primary sedimentation tank system 110 can perform the high-rate filtration process and at the same time treat solids in the sewage and wastewater with an existing sedimentation tank, so that it can flexibly respond to the load amount of the introduced sewage and wastewater. The specific structure of the primary sedimentation tank system 110 will be described with reference to FIGS. 2 to 4.

FIG. 2 is a diagram showing the configuration of the primary sedimentation tank system according to an embodiment of the present disclosure.

Referring to FIG. 2, the primary sedimentation tank system 110 according to an embodiment of the present disclosure includes a sewage and wastewater inlet 210, an inflow distribution channel 215, a pump station 220, a high-rate filtration part 230, a sludge thickening part 240, a sedimentation tank 250, an outflow distribution channel 260, and a control part (not shown).

The sewage and wastewater inlet 210 receives the sewage and wastewater flowing into the primary sedimentation tank system 110 and delivers it to the inflow distribution channel 215.

The inflow distribution channel 215 distributes the influent sewage and wastewater to the pump station 220 and the sedimentation tank 250. The inflow distribution channel 215 does not actively distribute the sewage and wastewater introduced from the sewage and wastewater inlet 210 to the pump station 220 or to the sedimentation tank 250. There is a height difference along the z-axis between the water gate 252 of the sedimentation tank 250 and the pump station 220. The pump station 220 is located at a relatively lower position (on the z-axis), and the water gate 252 of the sedimentation tank 250 is located at a relatively higher position. Therefore, when a certain amount of sewage and wastewater flows into the inflow distribution channel 215, all the sewage and wastewater flow into the pump station 220. However, a large amount of sewage and wastewater may flow in temporally at an early stage of rain water or a time period having high water use amount, and when sewage and wastewater flows in beyond the treatment capacity of the pump station 220, the water level of the sewage and wastewater in the z-axis gradually increases. When the water level of sewage and wastewater rises above the water gate 252 in the z-axis, the sewage and wastewater can be distributed to each sedimentation tank 250 through the inflow distribution channel 215.

The pump station 220 transfers the influent sewage and wastewater to the high-rate filtration part 230. The sewage and wastewater introduced through the inflow distribution channel 215 flows into the pump station 220, or the sewage and wastewater stored in the sedimentation tank 250, which will be described later, flows into the pump station 220. The pump station 220 has a preset treatment capacity and pumps the influent sewage and wastewater to the high-rate filtration part 230. The specific structure of the pump station 220 is shown in FIG. 7.

Figure 7:
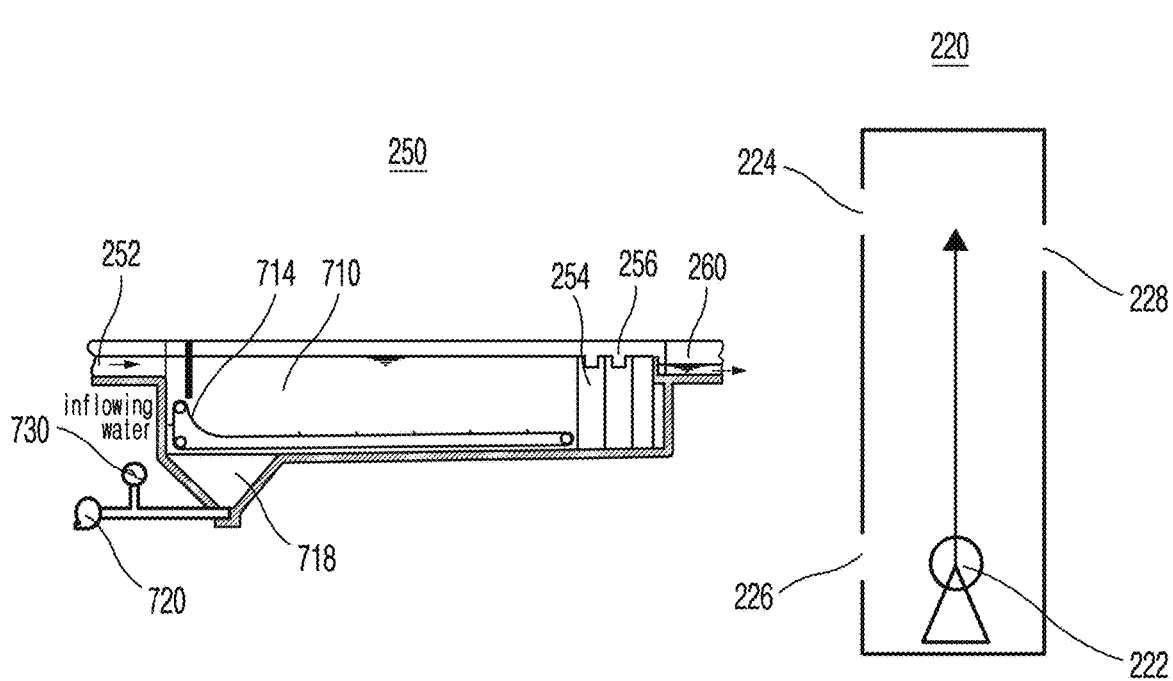
FIG. 7 is a schematic diagram of a sedimentation tank and a pump station according to an embodiment of the present disclosure.

FIG. 7 is a schematic diagram of a sedimentation tank and a pump station according to an embodiment of the present disclosure.

Referring to FIG. 7, the pump station 220 according to an embodiment of the present disclosure includes a pump 222, a first inlet 224, a second inlet 226, and an outlet 228.

The pump 222 discharges, through the outlet 228, the sewage and wastewater introduced through the inlets 224 and 226. Into the pump station 220, the sewage and wastewater flow from the inflow distribution channel 215 through the first inlet 224, or from the sedimentation tank 250 through the second inlet 226. The pump 222 discharges the influent sewage and wastewater through the outlet 228, so that the sewage and wastewater is delivered to the high-rate filtration part 230 through the pump station 220.

The sewage and wastewater flow into the first inlet 224 from the inflow distribution channel 215. The first inlet 224 is located at a relatively highest position, so that it receives the inflow of the sewage and wastewater from the inflow distribution channel 215.

The sewage and wastewater flow into the second inlet 226 from the sedimentation tank 250. The second inlet 226 is located at a relatively lowest position and is connected to a flow adjustment pipe 730, so that the sewage and wastewater can flow in and out between the sedimentation tank 250 and the pump station 220.

The outlet 228 allows the sewage and wastewater to flow out of the pump station 220. The outlet 228 is located at a relatively lower position than the first inlet 224 and at a relatively higher position than the second inlet 226. The outlet 228 is connected to an inflow pipe 310, so that it discharges the sewage and wastewater raised up to its position by the pump 222 to the inflow pipe 310.

Referring back to FIG. 2, the high-rate filtration part 230 filters out solids in the sewage and wastewater inflowing from the pump station 220. The sewage and wastewater flowing into the high-rate filtration part 230 is distributed to each of a plurality of filtration tanks 239. The solids in the sewage and wastewater introduced into the filtration tank 239 are filtered out by the filter media in the filtration tank, and the remaining treated water is discharged to an outflow distribution channel 260 along a treated water channel 233 in the high-rate filtration part 230. The specific structures of the high-rate filtration part 230 and the filtration tank 239 are shown in FIGS. 3 to 6.

Figure 3:
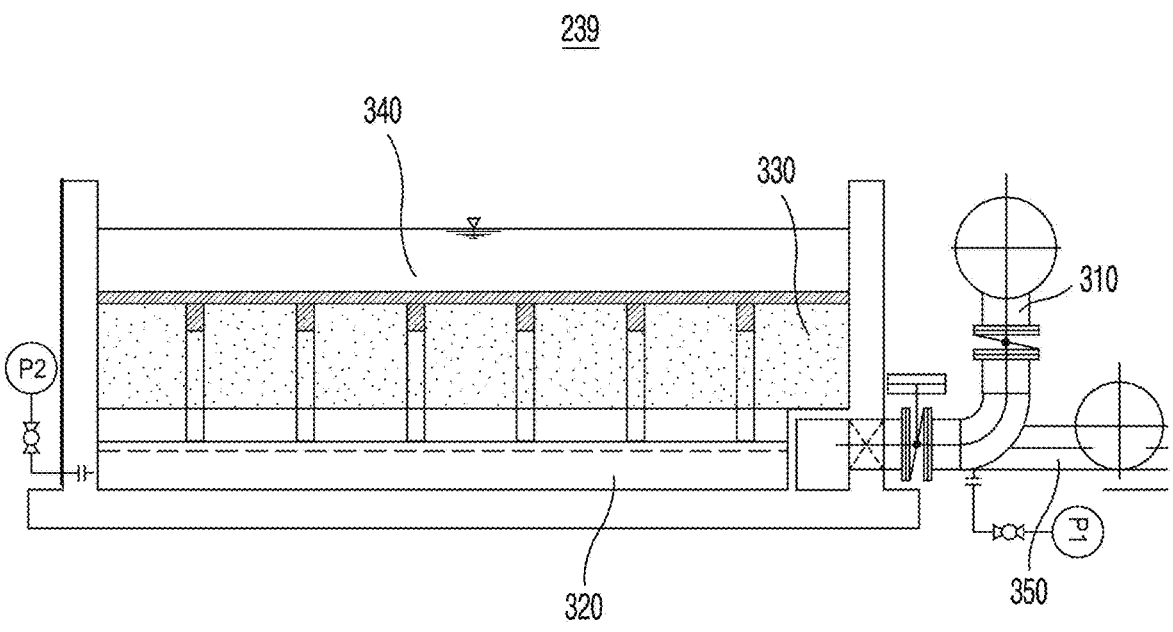
FIG. 3 is a schematic diagram of a filtration tank according to an embodiment of the present disclosure.
Figure 4:
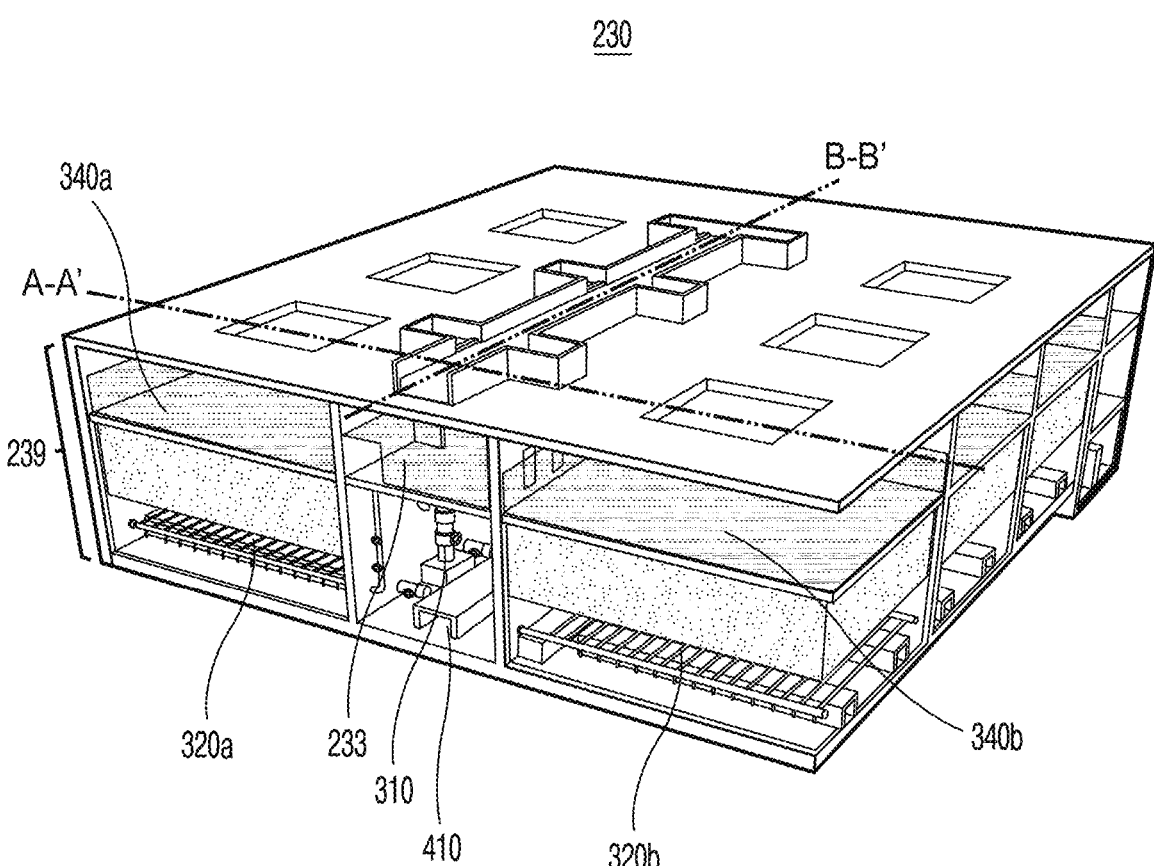
FIG. 4 is a perspective view of a high-rate filtration part according to an embodiment of the present disclosure.
Figure 5:
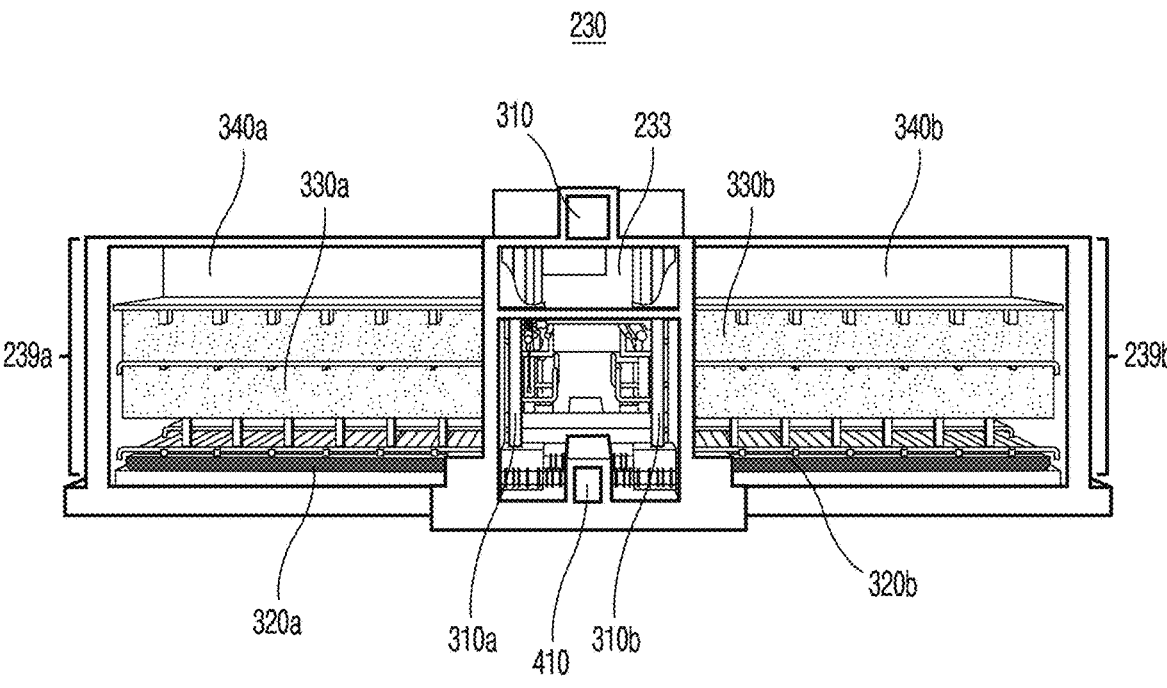
FIGS. 5 and 6 are cross-sectional views of a high-rate filtration part according to an embodiment of the present disclosure.
Figure 6:
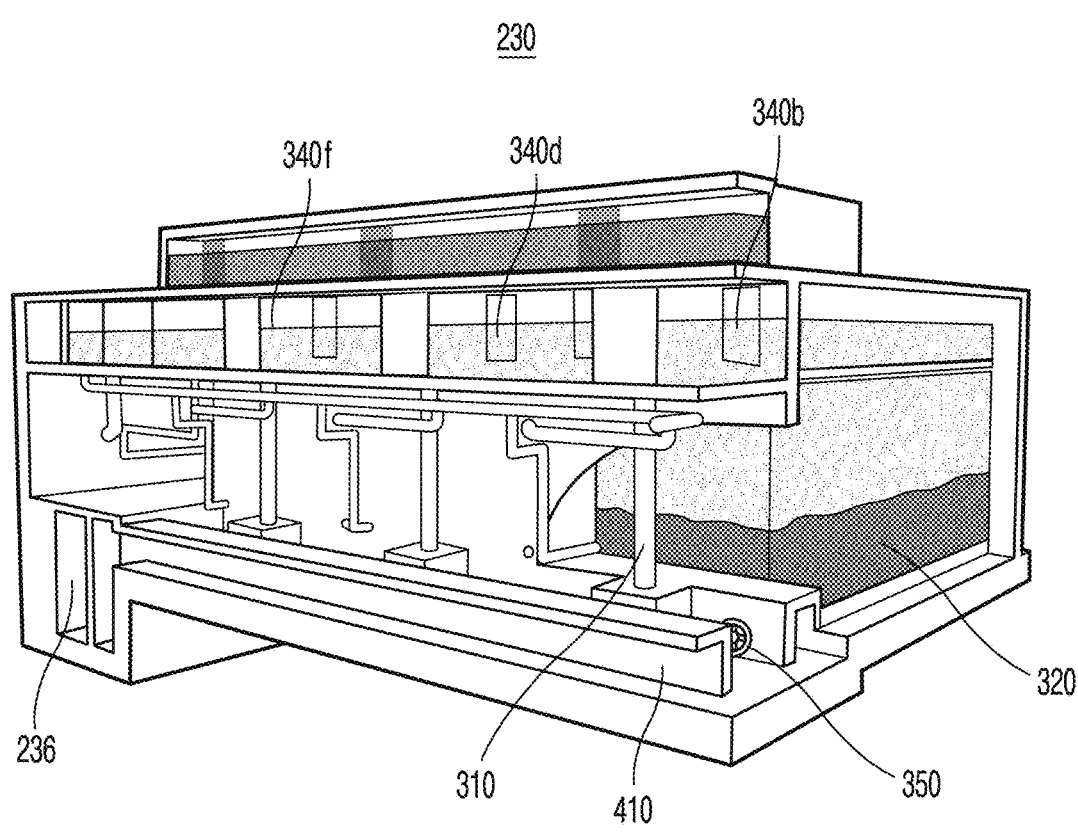

FIG. 3 is a schematic diagram of a filtration tank according to an embodiment of the present disclosure, FIG. 4 is a perspective view of a high-rate filtration part according to an embodiment of the present disclosure, and FIGS. 5 and 6 are cross-sectional views of a high-rate filtration part according to an embodiment of the present disclosure.

Referring to FIGS. 2 to 6, the high-rate filtration part 230 according to an embodiment of the present disclosure includes the treated water channel 233, a backwashing water tank 236, and the filtration tank 239. The filtration tank 239 according to an embodiment of the present disclosure includes the inflow pipe 310, an inflow distribution channel 320, a filter medium 330, a treated water storage tank 340, a backwashing pipe 350, and a backwashing water box 410.

The treated water channel 233 discharges, to the outflow distribution channel 260, the treated water from which the solids have been filtered out through the filtration tank 239.

The backwashing water tank 236 stores backwashing water for backwashing the filtration tank 239 and delivers the stored backwashing water to the sludge thickening part 240 according to the operation of a backwashing pump (not shown). However, the backwashing water tank 236 may not necessarily be included, and only a backwashing pump (not shown) may be included so that the backwashing water can be directly delivered to the sludge thickening part 240 as soon as it is discharged.

The filtration tank 239 filters out solids in the influent sewage and wastewater.

The inflow pipe 310 allows the sewage and wastewater delivered into the filtration tank 239 to flow into the filter medium 330 via the inflow distribution channel 320. The sewage and wastewater delivered to the high-rate filtration part 230 by the pump station 220 flows into the inflow pipe 310, and the introduced sewage and wastewater flows into the inflow distribution channel 320 along the inflow pipe 310.

The inflow distribution channel 320 allows the sewage and wastewater flowing into the inflow pipe 310 to be delivered to each filter medium 330 or allows the backwashing water inflowing through the filter medium 330 to be delivered to the backwashing pipe 350.

The filter medium 330 is in the filtration tank 239 to filter out solids in the sewage and wastewater flowing into the filtration tank 239. The filter medium 330 is formed to have a certain size and shape. A plurality of such filter media 330 are in the filtration tank 239 to a certain volume. The sewage and wastewater introduced into the filtration tank 239 through the inflow pipe 310 passes through the filter medium 330 in an upward flow through the inflow distribution channel 320. At this time, since the filter media 330 has a certain size and shape, a gap is formed between the adjacent filter media 330. Solids or contaminants smaller in size than the gap pass through, but solids of the size to be filtered out in the high-rate filtration part 230 do not move together with the sewage and wastewater and are filtered out by the gap. The filter media 330 form the gap in this way and filter out solids in the influent sewage and wastewater (as an upward flow). Such filtration tank 239 has a filtration speed of 10 to 25 m/hr, which is 10 to 20 times higher than the surface load rate (1 to 2 m/hr) of a conventional sedimentation tank.

The treated water storage tank 340 allows the sewage and wastewater that has passed through the filter medium 330 to be discharged along the treated water channel 233 to the outflow distribution channel 260, or delivers the backwashing water flowing into the filtration tank 239 to the filter medium 330. Since the sewage and wastewater passing through the filter medium 330 has undergone primary filtration of solids, it is discharged to the treated water channel 233 through the treated water storage tank 340 and discharged to the outflow distribution channel 260 along the treated water channel 233. Meanwhile, as the filter medium 330 continuously filters out solids, a considerable amount of solids may be caught within the gap between the filter media 330, and the smooth passage of sewage and wastewater may be hindered or the solids may not be smoothly filtered out. To this end, the backwashing water from the treated water channel 233 flows into the treated water storge tank 340. The backwashing water passes through the treated water storage tank 340 to backwash each of the filter media 330, and the backwashing water after backwashing the filter media 330 passes through the inflow distribution channel 320 and is discharged to the backwashing pipe 350.

The backwashing pipe 350 delivers, to the backwashing water box 410, the backwashing water discharging from the inflow distribution channel 320. The backwashing water may pass through the backwashing pipe 350 and the backwashing water box 410, and be stored in the backwashing water tank 236, and then be delivered to the sludge thickening part 240.

The backwashing water box 410 receives the backwashing water from the backwashing pipe 350 and delivers it to the backwashing water tank 236. One end of the backwashing water box 410 is connected to the backwashing water tank 236, and the middle or other end of the channel is connected to the backwashing pipe 350. Accordingly, the backwashing water box 410 delivers the backwashing water inflowing from the backwashing pipe 350 to the backwashing water tank 236.

Since the filtration tank 239 improves the filtration speed by 10 to 25 times using the filter medium 330, the area of the filtration tank 239 may be ¹⁄₁₀ to ¹⁄₂₅ compared to that of the conventional sedimentation tank in treating the same load amount of sewage and wastewater. According to these characteristics, the high-rate filtration part 230 can include a plurality of filtration tanks 239, so that a throughput equal to or greater than that of the entire conventional sedimentation tank (filtration capacity) can be obtained.

The inflow distribution channel 320 and the treated water storage tank 340 in each filtration tank are connected to each other. The treated water filtered in each filtration tank 239 is stored in the treated storage tank 340 and flows to the outflow distribution channel 260 along the treated water channel 233. According to the control of a control part (not shown), each filtration tank 239 uses, as the backwashing water, the treated water that is sequentially introduced into the treated water storage tank 340 and stored therein. As described above, since the plurality of filtration tanks 239 exist in the high-rater filtration part 230, even if the treated water is not discharged from any one of the filtration tanks

239, the flow rate of the treated water does not fluctuate greatly. Accordingly, during the backwashing, the treated water is discharged in the opposite direction (vertically downward) to the flow direction of water during normal filtration, thereby washing the filter medium 330 located vertically below the treated water storage tank 340. The backwashed backwashing water flows into the inflow distribution channel 320 and then flows into the backwashing water tank 236 via the backwashing pipe 350 and the backwashing water box 410. The backwashing water flowing into the backwashing water tank 236 flows into the sludge thickening part 240 immediately or after being stored.

The sludge thickening part 240 receives the backwashing water from the backwashing water tank 236 and thickens the sludge. The backwashing water is introduced into the sludge thickening part 240, where the sludge in the backwashing water sediments to the lower end thereof over time. As the backwashing water gradually flows in, the water level of the backwashing water in the sludge thickening part 240 rises. When the water level (in the z-axis direction) of the backwashing water is higher than the weir 244, the upper water is discharged to a discharge water channel 248 beyond the weir 244. The upper water discharged to the discharge water channel 248 is discharged to the outflow distribution channel 260 along the discharge water channel 248. Like the sedimentation tank 250, the sludge thickening part 240 may also perform a role of filtering out solids by settling sludge in the backwashing water and discharging only the upper water.

The sedimentation tank 250 stores the sewage and wastewater flowing through the water gate 252 or from the pump station 220, and, in some cases, filters out solids in the sewage and wastewater by settling them. The detailed structure of the sedimentation tank is shown in FIG. 7.

FIG. 7 is a schematic diagram of a sedimentation tank and a pump station according to an embodiment of the present disclosure.

Referring to FIG. 7, the sedimentation tank 250 according to an embodiment of the present disclosure includes the water gate 252, a weir 254, a discharge water channel 256, a settling tank 710, a sludge collector 714, a sludge hopper 718, a sludge discharging pump 720, and a flow rate adjustment pipe 730. The sedimentation tank 250 of FIG. 7 is a cross-section of the sedimentation tank 250 taken along the line A-A' in FIG. 2.

The water gate 252 controls the inflow and outflow of the sewage and wastewater flowing into the inflow distribution channel 215 to and from the sedimentation tank 250. The water gate 252 is positioned at a height at which the sewage and wastewater can be introduced when the flow rate of the introduced sewage and wastewater increases and exceeds the first upper limit value. That is, the amount of influent sewage and wastewater may rapidly increase due to wetweather flow or at a specific point in time. Accordingly, when the amount of sewage and wastewater exceeds the first upper limit value, which is the flow rate that can be treated by the high-rate filtration part 230, the water gate 252 operates and allows the excess amount of sewage and wastewater to flow into the sedimentation tank 250. The water gate 252 may be a structure that operates independently, or may be implemented in a form in which a water gate and a weir are combined.

The weir 254 allows the upper water to be discharged into the discharge water channel 256 when the sedimentation tank 250 operates to treat the early stage wetweather flow. When the flow rate of sewage and wastewater flowing into the inflow distribution channel 215 exceeds the second upper limit value, the sedimentation tank 250 does not merely serve as a settling tank 710 but may be operated for treating the early stage wetweather flow like a conventional sedimentation tank to remove solids from sewage and wastewater. At this time, the weir 254 is implemented to have a predetermined height, so that the sewage and wastewater can be stored in the settling tank 710 up to the height of the weir 254. In order for the water level of sewage and wastewater to reach the height of the weir 254 in the settling tank 710, the wastewater and wastewater must be stored for a certain period of time, during which solids in the sewage and wastewater are settled. When the water level of sewage and wastewater in the settling tank 710 exceeds the height of the weir 254, the upper water is discharged to the discharge water channel 256, and then discharged to the outflow distribution channel 260.

The discharge water channel 256 is connected to the outflow distribution channel 260 to deliver to the outflow distribution channel 260, the upper water delivered from the weir 254.

The settling tank 710 stores the sewage and wastewater flowing through the water gate 252 or the flow rate adjustment pipe 730. The sludge collector 714 may be located within the settling tank 710. The sludge collector 714 is located at the bottom of the settling tank 710, and collects, into a sludge hopper 718, the sludge settled from the sewage and wastewater flowing into the settling tank 710.

The sludge hopper 718 is a recessed portion at a location on the bottom of the settling tank 710 and stores the sludge settled from the sewage and wastewater flowing into the settling tank 710. The sludge hopper 718 is located at the bottom of the settling tank 710 in a funnel-like shape or other shape which can collect the sludge collected by the sludge collector (714) and stores the sludge (solids) in the introduced sewage and wastewater.

The sludge discharging pump 720 transfers sludge stored in the sludge hopper 718 to the outside. In this regard, when the stored sludge is discharged to the outside, the sludge discharging pump 720 can transfer the sludge only to the outside by shutting off the flow rate adjustment pipe 730 so that the sludge does not flow into the second inlet 226 of the pump station 220 along the flow rate adjustment pipe 730.

The flow rate adjustment pipe 730 connects the settling tank 710 with the pump station 220, more specifically, the second inlet 226. One end of the flow rate adjustment pipe 730 is connected to the lowermost end of the sludge hopper 718 of the storage tank, and the other end thereof is connected to the second inlet 226 of the pump station 220. Accordingly, when the load amount of the sewage and wastewater introduced into the pump station 220 is higher than the first upper limit value, the pump station 220 discharges the introduced sewage and wastewater to the settling tank 710 via the flow rate adjustment pipe 730. Conversely, when the load amount of the sewage and wastewater introduced into the pump station 220 is lower than the first upper limit value, the sewage and wastewater stored in the settling tank 710 flows back into the pump station 220 along the flow rate adjustment pipe 730. As the flow rate adjustment pipe 730 is formed as described above, the sedimentation tank 250 may serve as a flow rate adjustment tank, allowing the sewage and wastewater to flow in and out depending on the load amount of the sewage and wastewater flowing into the pump station 220.

Referring back to FIG. 2, the outflow distribution channel 260 receives the treated water or upper water discharged along the treated water channel 233 and the discharge water channel 248 and 256 and discharge the same through the water gate 270 to the bioreactor tank 120. In according to circumstances, to the outflow distribution channel 260, the treated water from the treated water channel 233 and the upper water only from the discharge water channel 248 may be introduced, or the treated water from the treated water channel 233 and the upper water from the discharge water channel 248 and 256 may be introduced. The treated water and the upper water introduced in this way are discharged to the bioreactor tank 120 through the water gate 270, so that they can be post-treated.

The operation of each component in the primary sedimentation tank system 110 may be controlled by a control part (not shown).

The control part (not shown) operates the pump station 220 to pump the sewage and wastewater to the high-rate filtration part 230. The pump station 220 needs to filter out solids by continuously flowing the influent sewage and wastewater into the high-rate filtration part 230. Therefore, the control part (not shown) operates the pump station 220 while the sewage and wastewater flows into the sewage and wastewater inlet 210. However, when the sedimentation tank 250 discharges the sludge (solids) settled in the sludge hopper 718 while the water gate 252 is not opened, or when the water level of the sewage and wastewater flowing into the pump station 220 does not reach the pump 222, the control part (not shown) controls the pump station 220 not to operate. When the sludge is discharged from the sedimentation tank 250 while the water gate 252 is not opened, it means that there is a large amount of solids settled in the sewage and wastewater stored in the settling tank 710 to adjust the flow rate. In this situation, when the pump station 220 operates, the sewage and wastewater flow into the sedimentation tank 250 along the flow rate adjustment pipe 730, which in turn leads to the dispersion of the settled sludge. Therefore, since smooth extraction of the sludge is impossible, the control part (not shown) shuts off the flow rate adjustment pipe 730 connected to the pump station 220, while the sedimentation tank 250 discharges the sludge (solids) settled in the sludge hopper 718. Meanwhile, when the water level of the sewage and wastewater in the pump station 220 does not reach the pump 222 due to low inflow of the sewage and wastewater, the control part (not shown) also stops the operation of the pump station 220. When the pump 222 operates without being immersed in the sewage and wastewater, there is a risk of damage to the pump 222, so the control part (not shown) stops the operation of the pump station 220 even in the above-mentioned situation.

The control part (not shown) controls the high-rate filtration part 230 to generate treated water or backwashing water. The control part (not shown) controls the high-rate filtration part to filter out solids by shutting off the backwashing pipe 350. When the backwashing pipe is shut off, since the backwashing water cannot enter the backwashing pipe 350, the treated water in the treated water storage tank 340 cannot be discharged in the direction toward the filter medium 330 but proceeds along the treated water channel 233. Conversely, the control part (not shown) shuts off the inflow pipe 310 to allow backwashing to proceed in the filtration tank 239 of the high-rate filtration part. When the inflow pipe 310 is shut off, the inflow of sewage and wastewater into the treated water storage 340 is shut off, and the treated water in the treated water storage 340 cannot enter the treated water channel 233. In this regard, when the backwashing pipe 350 is opened, the treated water in the upper treated water storage tank 340 is discharged in the direction toward the filter medium 330 (vertically downward), and the backwashing water flows to the backwashing water box 410 through the inflow distribution channel 320 and the backwashing pipe 350.

The control part (not shown) controls one filtration tank 239 to perform the backwashing. When the backwashing of one filtration tank 239 is completed, the control part (not shown) backwashes another filtration tank according to the time or the measured value of the loss of head.

The control part (not shown) controls the operation of the sedimentation tank 250.

The control part (not shown) controls the operation of the water gate 252 based on whether the load amount of the sewage and wastewater flowing into the sewage and wastewater inlet 210 exceeds a first predetermined reference value. The control part (not shown) determines the load amount of the sewage and wastewater flowing into the sewage and wastewater inlet 210. Here, the load amount of the sewage and wastewater is a factor affecting treatment in the bioreactor tank 120 and includes the flow rate of the sewage and wastewater or the concentration of contaminants in the sewage and wastewater. When the flow rate is too high, the bioreactor tank 120 cannot completely treat the influent sewage and wastewater. The concentrations of contaminants in the sewage and wastewater are also the same. Even if the flow rate is not high, even if the concentration of the contaminants is excessively high, the bioreactor tank 120 cannot completely treat the incoming sewage and wastewater. The control part (not shown) determines whether the load amount of the sewage and wastewater flowing into the sewage and wastewater inlet 210, in particular, the flow rate of the sewage and wastewater exceeds a first predetermined reference value. Here, in determining the flow rate, the first predetermined reference value refers to a range in which a ratio of the flow rate flowing into the sewage and wastewater inlet 210 with respect to the flow rate that can be treated by the high-rate filtration part 230 exceeds 1 and does not exceed 2 or 3. When the above-described ratio exceeds 1, even if the pump station 220 and the high-rate filtration part 230 continuously operate, the water level of the sewage and wastewater in the inflow distribution channel 215 rises. When the load amount of the sewage and wastewater exceeds the first predetermined reference value and the water level of the sewage and wastewater within the inflow distribution channel 215 reaches the height of the water gate 252, the control part (not shown) opens the water gate 252 to allow the sewage and wastewater to flow into the sedimentation tank 250. By allowing the sewage and wastewater to flow into the sedimentation tank 250, the control part (not shown) allows the sedimentation tank 250 to adjust the flow rate or sediment and remove solids (sludge).

The control part (not shown) controls the operation of the sludge discharging pump 720 and the flow rate adjustment pipe 730. When sludge is settled in the sludge hopper 718 at a predetermined standard or more, the control part (not shown) operates the sludge discharging pump 720 to transfer the sludge. However, when the sludge discharging pump 720 is operated, the flow rate adjustment pipe 730 is shut off so that the sludge does not flow into the pump station 220. This is because when the flow rate adjustment pipe 730 is not shut off, the sewage and wastewater flow from the bottom of the sludge hopper 718 along the flow rate adjustment pipe 730, and the sludge is not extracted smoothly.

Figure 8:
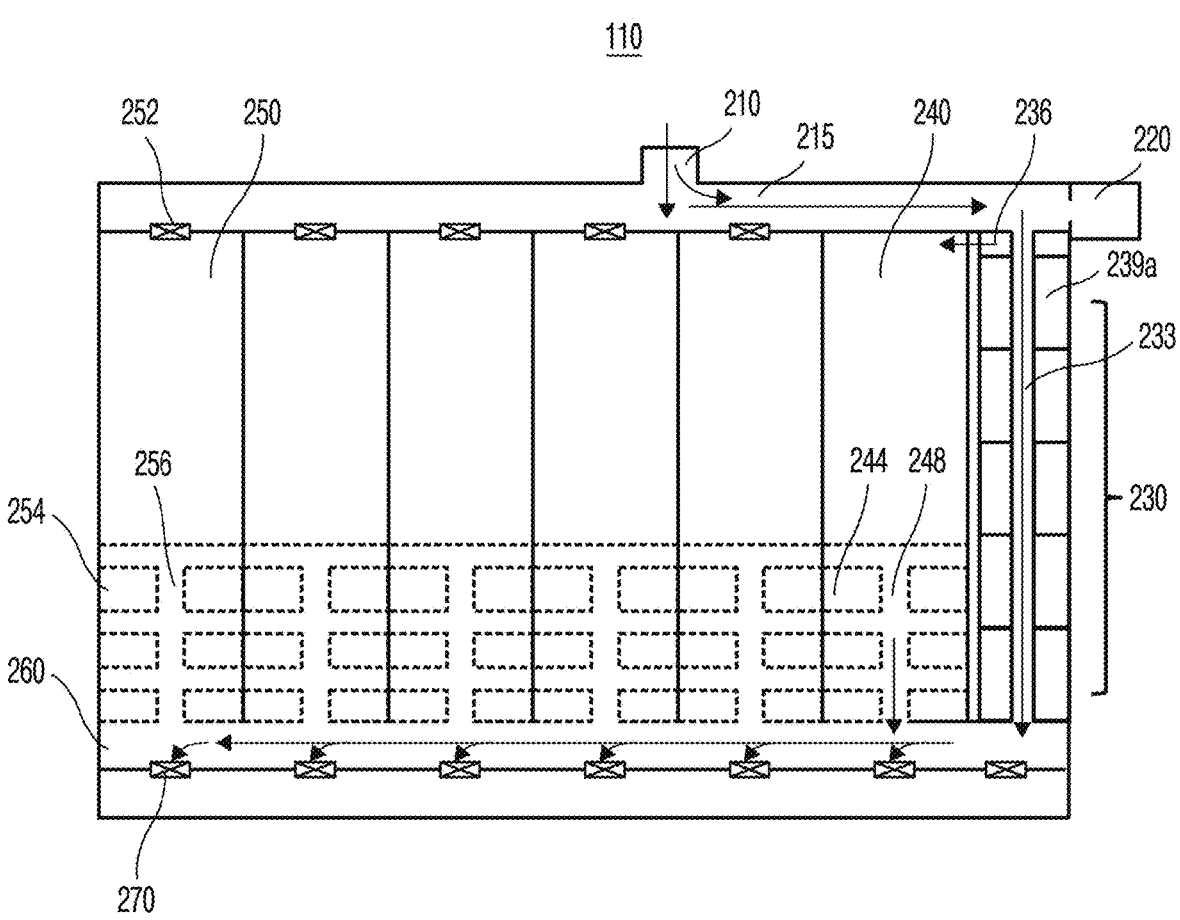
FIG. 8 is a schematic diagram showing an operation when the sewage and wastewater having a load amount of less than or equal to the first upper limit value is introduced into the primary sedimentation tank according to an embodiment of the present disclosure.
Figure 9:
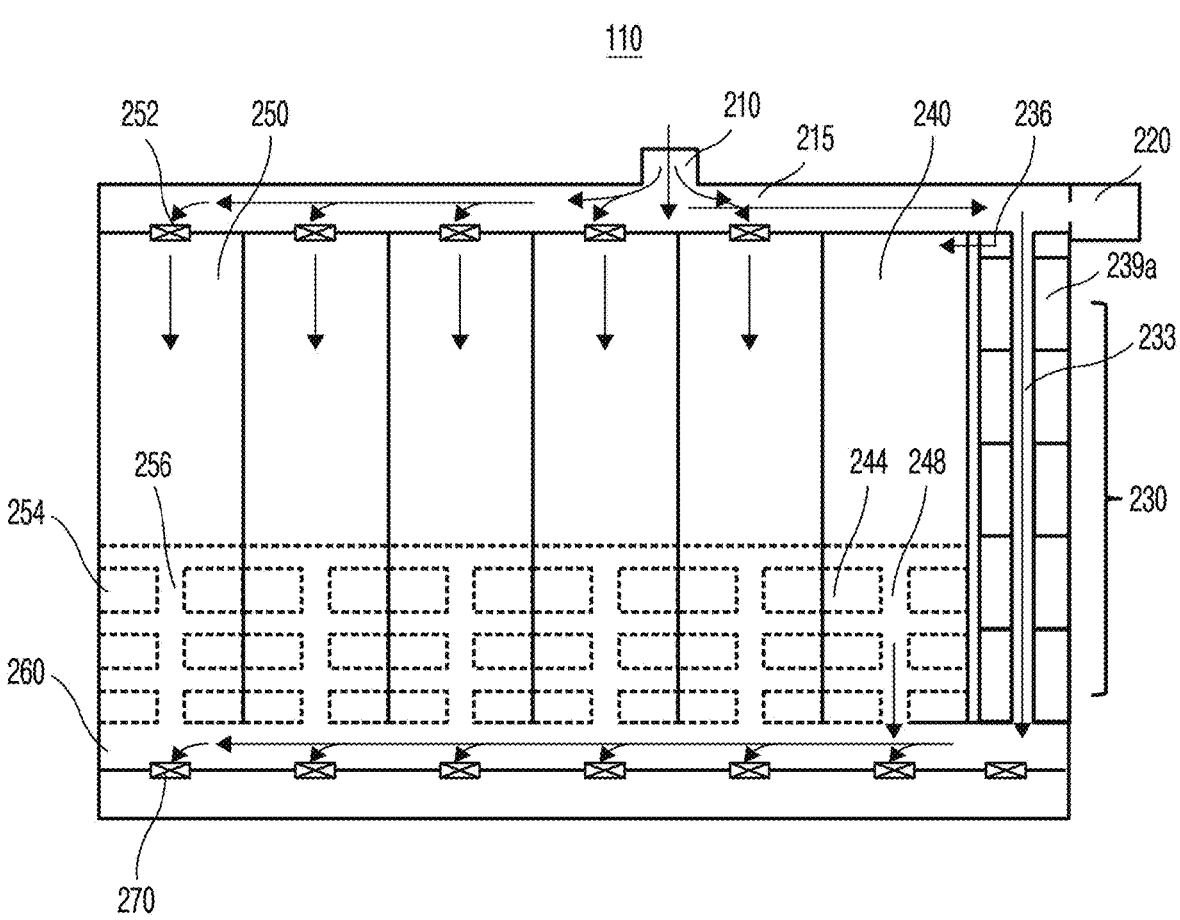
FIG. 9 is a schematic diagram showing an operation when the sewage and wastewater having a load amount equal to or greater than the first upper limit value and less than or equal to the second upper limit value is introduced into the primary sedimentation tank according to an embodiment of the present disclosure.
Figure 10:
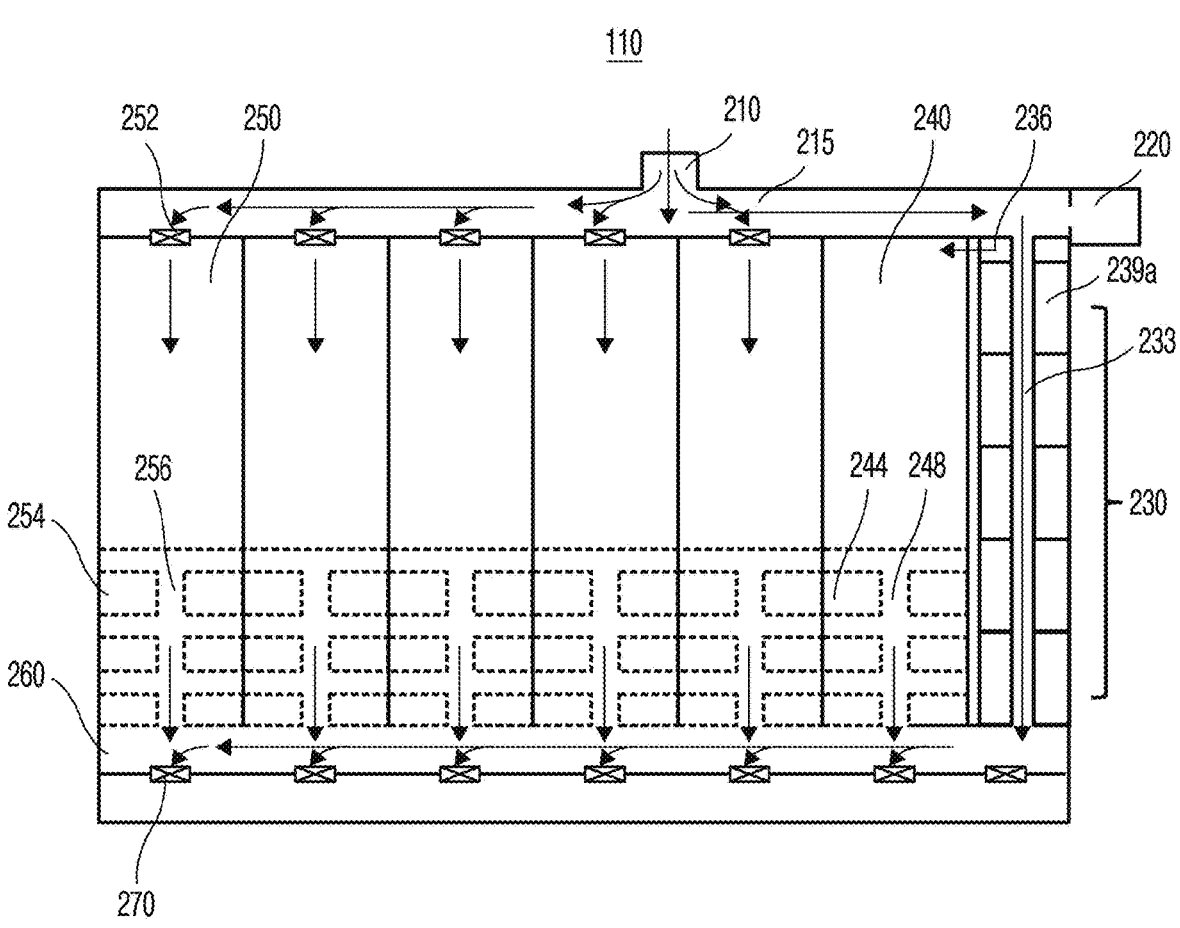
FIG. 10 is a schematic diagram showing an operation when the sewage and wastewater having a load amount greater than or equal to the second upper limit value is introduced into the primary sedimentation tank according to an embodiment of the present disclosure.

The control part (not shown) controls the operation of each component differently depending on whether the load amount of the sewage and wastewater flowing into the primary sedimentation tank system 110 exceeds the first upper limit value or the second upper limit value. An operation when the load amount of the sewage and wastewater flowing into the primary sedimentation tank system 110 is equal to or less than the first upper limit value or the concentration of the sewage and wastewater flowing into the primary sedimentation tank system 110 is equal to or greater than the first upper limit is shown in FIG. 8. An operation when the load amount of the sewage and wastewater flowing into the primary sedimentation tank system 110 is equal to or greater than the first upper limit value and less than or equal to the second upper limit value is shown in FIG. 9. An operation when the load amount of the sewage and wastewater flowing into the primary sedimentation tank system 110 is equal to or greater than the second upper limit value is shown in FIG. 10.

In the flow rate, the first upper limit value may refer to a range, as described above, in which a ratio of the flow rate flowing into the sewage and wastewater inlet 210 with respect to the flow rate that can be treated by the high-speed filtration part 230 exceeds 1 and does not exceed 2 or 3. In the flow rate, the second upper limit value may refer to a range in which a ratio of the flow rate flowing into the sewage and wastewater inlet 210 with respect to the flow rate that can be treated by the high-speed filtration part 230 exceeds 2 or 3.

In the concentration, the first upper limit value may refer to a case where a ratio of the amount of contaminants in the sewage and wastewater flowing out to the bioreactor tank 120 for a predetermined time with respect to the amount of contaminants in the sewage and wastewater that can be treated for the predetermined time in the bioreactor tank 120 exceeds 1.

Operation control by the control part (not shown) for each situation will be described with reference to each corresponding drawing.

FIG. 8 is a schematic diagram showing an operation when the sewage and wastewater having a load amount of less than or equal to the first upper limit value is introduced into the primary sedimentation tank according to an embodiment of the present disclosure.

If the load amount of the sewage and wastewater flowing into the primary sedimentation tank system 110 is equal to or less than the first upper limit value, a separate flow rate adjustment is not required. Therefore, the control part (not shown) operates the pump station 220 to allow the introduced sewage and wastewater to flow into the high-rate filtration part 230. However, when the water level of the sewage and wastewater in the pump station 220 does not reach the pump 222, the control part (not shown) stops the operation of the pump station 220, or if otherwise, it operates the pump station 220 continuously. The control part (not shown) controls the remaining filtration tanks 239 except for one filtration tank 239 in the high-rate filtration part 230 to perform a filtration operation and controls the one filtration tank 239 to perform the backwashing according to the time or the measured value of the loss of head. When the filtration operation is performed, the treated water is discharged to the bioreactor tank 120 via the treated water channel 233, the outflow distribution channel 260, and the water gate 270. When the backwashing operation is performed, the backwashing water (stored in the backwashing water tank 236 and from the backwashing water tank 236) flows into the sludge thickening part 240 through the backwashing pipe 350 and the backwashing water box 410. The sludge sedimentation is performed in the sludge thickening part 240, and the upper water is discharged to the discharge channel 248 over the weir 244. The upper water discharged to the discharge channel 248 is also discharged to the bioreactor tank 120 through the outflow distribution channel 260 and the water gate 270, similarly to the treated water of the high-rate filtration part.

Meanwhile, even when the concentration of the load amount of the sewage and wastewater flowing into the primary sedimentation tank system 110 exceeds the first upper limit value, the operation is performed as shown in FIG. 8. However, if the concentration of the influent sewage and wastewater exceeds the first upper limit value, it is necessary to adjust the flow rate for the amount of the sewage and wastewater exceeding the first upper limit value. Therefore, the control part (not shown) performs the same control for the filtration of solids as in the above-described situation (when the load amount of the sewage and wastewater flowing into the primary sedimentation tank system 110 is equal to or less than the first upper limit value), and the control part (not shown) controls the flow rate adjustment pipe 730 and the pump station 220 so that the amount of the sewage and wastewater exceeding the first upper limit value is stored in some or all of the sedimentation tanks 250. After the treatment of the remaining sewage and wastewater is completed in the high-rate filtration part 230, the control part (not shown) controls the flow rate adjustment pipe 730 and the pump station 220 to discharge the sewage and wastewater stored in the sedimentation tank 250 into the pump station 220 to filter out the same. By operating in this way, the primary sedimentation tank system 110 can adjust the flow rate according to the concentration.

FIG. 9 is a schematic diagram showing an operation when the sewage and wastewater having a load amount equal to or greater than the first upper limit value and less than or equal to the second upper limit value is introduced into the primary sedimentation tank system according to an embodiment of the present disclosure.

When the flow rate of the load amount of the sewage and wastewater flowing into the primary sedimentation tank system 110 is greater than or equal to the first upper limit value and less than or equal to the second upper limit value, the control part (not shown) operates the pump station 220 and the high-rate filtration part 230 similarly. However, in spite of the operation of the pump station 220 and the high-rate filtration part 230, the influent sewage and wastewater cannot be completely treated, and too much flow rate flows into the bioreactor tank 120. Accordingly, when the water level of the sewage and wastewater in the inflow distribution channel 215 reaches the water gate 252, the control part (not shown) opens some or all of the water gates 252 in the sedimentation tank system 110 according to the inflow amount or load amount. As the water gate 252 is opened, some of the influent sewage and wastewater flows into each corresponding sedimentation tank 250. Since the flow rate of the sewage and wastewater flowing into the primary sedimentation tank system 110 does not exceed the second upper limit value, the upper water is not discharged to the discharge water channel 256 of the sedimentation tank 250. The sedimentation tank 250 stores the introduced sewage and wastewater to adjust the flow rate and discharges the same to the pump station 220 through the flow rate adjustment pipe 730 depending on the water level of the sewage and wastewater in the pump station 220. Since the flow rate adjustment pipe 730 connects the pump station 220 and the sedimentation tank 250, when the water level of the sewage and wastewater in the pump station 220 is high, the sewage and wastewater does not flow into the pump station 220 from the sedimentation tank 250, while, in the opposite case, the sewage and wastewater flows from the sedimentation tank 250 into the pump station 220. The control part (not shown) closes the water gate 252 when the water level of the sewage and wastewater in the inflow distribution channel 215 is lower than the water gate 252.

Meanwhile, in operating according to the operation shown in FIG. 8 or 9, the control part (not shown) operates the sludge discharging pump 720 to extract the sludge settled in the sedimentation tank 250.

FIG. 10 is a schematic diagram showing an operation when the sewage and wastewater having a load amount greater than or equal to the second upper limit value is introduced into the primary sedimentation tank according to an embodiment of the present disclosure.

If the flow rate of the load amount of the sewage and wastewater flowing into the primary sedimentation tank system 110 is equal to or greater than the second upper limit value, it corresponds to a situation in which the treatment for early stage of rainwater is required. Therefore, the control part (not shown) operates the pump station 220 and the high-rate filtration part 230, and opens the water gate 252, so that solids in the sewage and wastewater are settled in each corresponding sedimentation tank 250. Solids in the influent sewage and wastewater can be removed by being filtered out or settled by or in both the high-rate filtration part 230 and the sedimentation tank 250, so that even in situations where the flow rate rapidly increases, such as the early stage of rain water, the flexible treatment can be achieved. Since the removal of solids is continuously performed in the sedimentation tank 250, the control part (not shown) operates the sludge discharging pump 720 to extract the sludge and shuts off the flow rate adjustment pipe 730 for the sludge extraction.

As the primary sedimentation tank system 110 operates in this way, it is possible to remove solids, which is an inherent operation of the conventional sedimentation tank, and at the same time adjust the flow rate for controlling the load amount of the sewage and wastewater to be introduced into the bioreactor tank 120, and it is also possible to flexibly treat the sewage and wastewater even in a case where the flow rate increases rapidly, such as in the early stage of rain water.

This is because all of the above-described operations can be performed only by replacing the sedimentation tank in the conventional settling tank with the high-rate filtration part and the sludge thickening part 240 having one sedimentation tank area, and additionally disposing the pump station 220. Therefore, compared to the conventional apparatus for treating sewage and wastewater that had to have a flow rate adjustment tank, a sedimentation tank, and a tank for treating the wetweather flow, respectively, the apparatus for treating sewage and wastewater system 100 can give many advantages in terms of the minimization of site area and economic feasibility.

Figure 11:
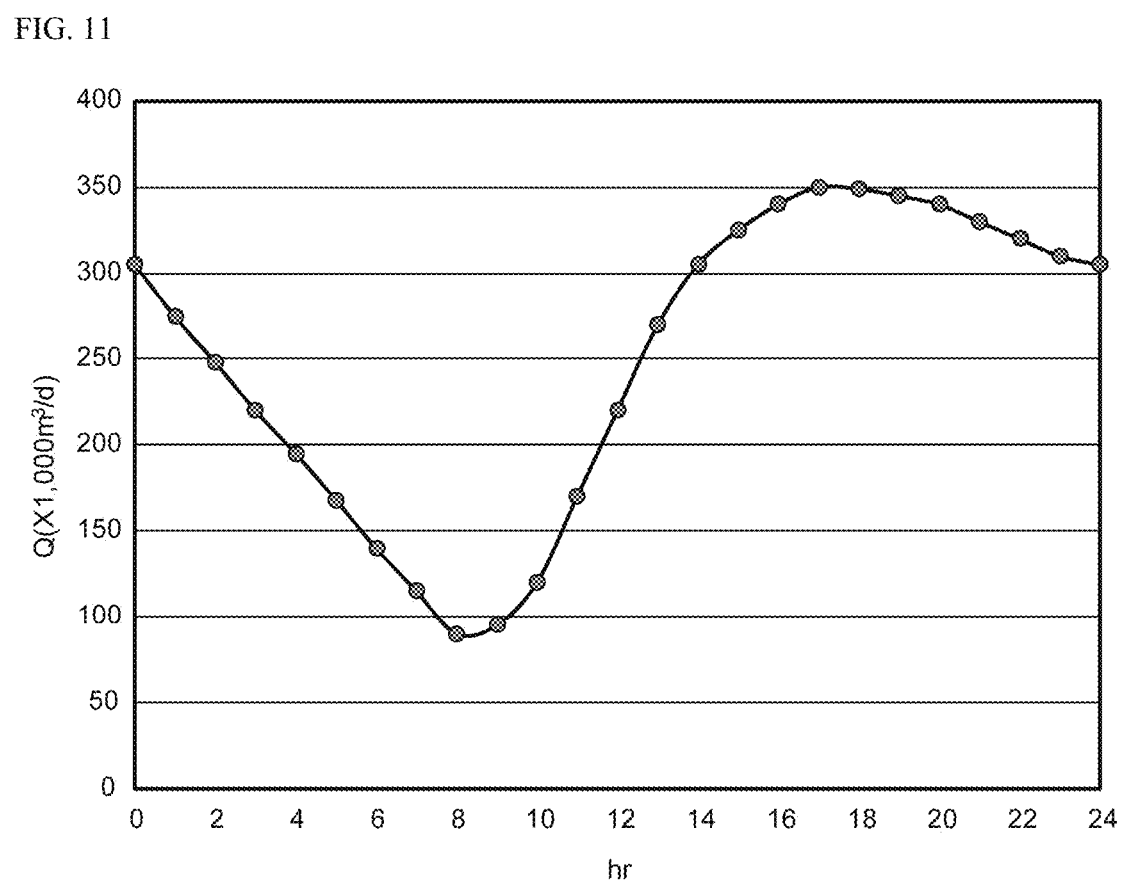
Figure 12:
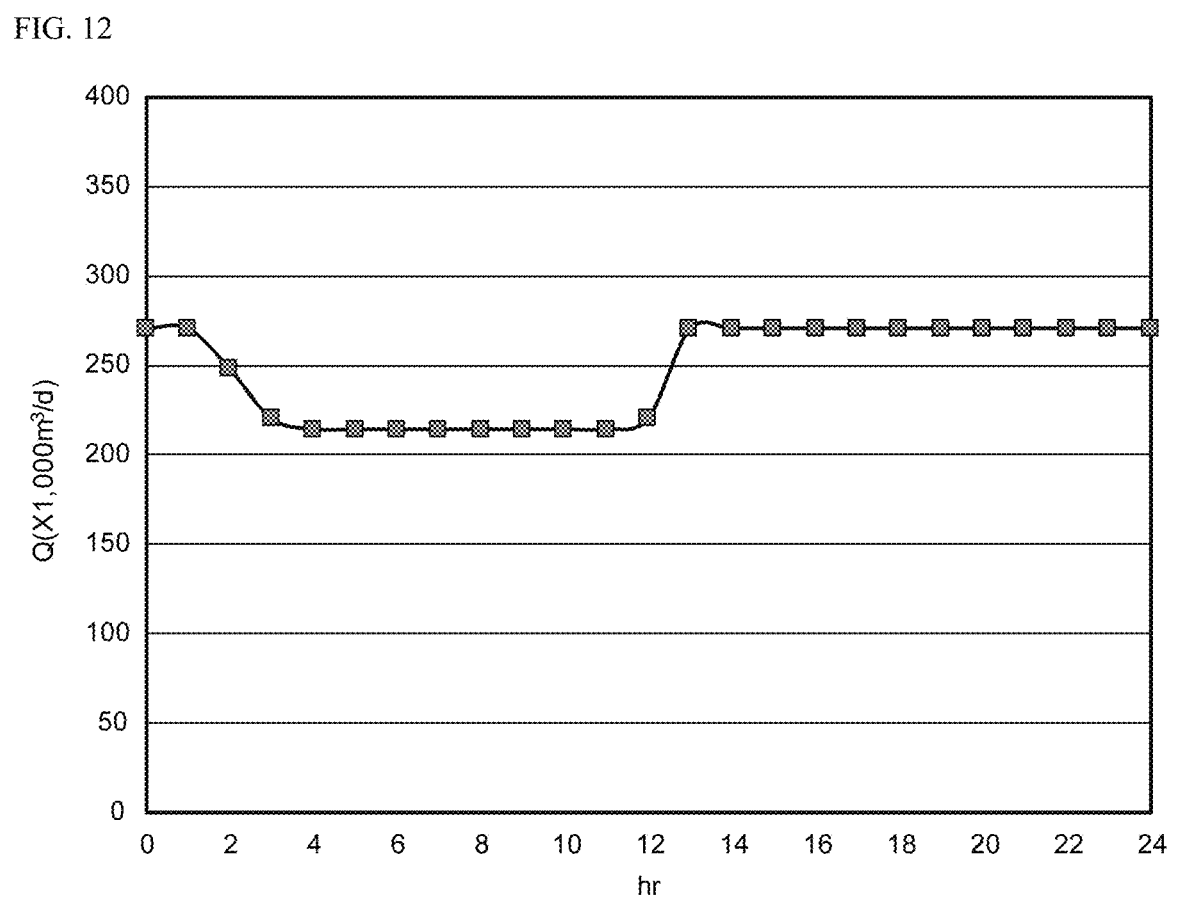

FIG. 11 is a graph showing the flow rate of the sewage and wastewater outflowing from a conventional primary sedimentation tank, and FIG. 12 is a graph showing the flow rate of the sewage and wastewater outflowing from a primary sedimentation tank according to an embodiment of the present disclosure.

Referring to FIG. 11, it can be confirmed that the ratio of the maximum flow rate and the minimum flow rate of the flow rate of the sewage and wastewater outflowing from the conventional primary sedimentation tank is close to 3.5 to 4. As such, in the related art, since the flow rate of the sewage and wastewater outflowing from the primary sedimentation tank was not constant due to the absence of a flow rate adjustment tank, it was difficult to expect stable sewage and wastewater treatment efficiency.

However, the ratio of the maximum flow rate and the minimum flow rate of the sewage and wastewater outflowing from the primary sedimentation tank system 110 in the apparatus for treating sewage and wastewater according to an embodiment of the present disclosure is significantly reduced to a level of 1.3, thereby making it possible to expect the stable sewage and wastewater treatment efficiency through the constant flow rate distribution.

The above description is merely illustrative of the technical idea of the present embodiment, and various modifications and changes can be made by those of ordinary skill in the art to which the present embodiment pertains, without departing from the essential characteristics of the present embodiment. Accordingly, the embodiments are not for limiting, but for explaining the technical spirit of the present embodiment, and the scope of the technical idea of the present embodiment is not limited by these embodiments. The protection scope of the present embodiment should be construed based on the following claims, and all technical ideas within the scope equivalent thereto should be construed as being included in the scope of the present embodiment.

What is claimed is:

1. A sedimentation tank system for removing solids in an influent sewage and wastewater, the sedimentation tank system comprising:

a filtration part which includes a filter medium and removes solids in the influent sewage and wastewater;

a sedimentation tank with a water gate formed at a predetermined height to store sewage and wastewater flowing over the water gate;

an outflow distribution channel that receives from the filtration part, sewage and wastewater from which solids have been removed, and discharges the same to an outside of the sedimentation tank;

a pump station configured to pump the influent sewage and wastewater to flow into the filtration part; and a flow rate adjustment pipe connecting a lower end of the sedimentation tank and the pump station to enable the inflow and outflow of sewage and wastewater between the pump station and the sedimentation tank, wherein the sedimentation tank system is configured such that the sewage and wastewater stored in the sedimentation tank flows back to the pump station via the flow rate adjustment pipe, and the pump station pumps the returned sewage and wastewater to the filtration part so that the returned sewage and wastewater is filtered by the filter medium.

2. The sedimentation tank system of claim 1, further comprising a control part that controls an operation of each component in the sedimentation tank and controls the operation of the water gate or the outflow distribution channel by perceiving a load amount of sewage and wastewater flowing into the sedimentation tank.

3. The sedimentation tank system of claim 1, wherein the filtration part includes a plurality of filtration tanks which include the filter medium and remove solids in the influent sewage and wastewater using the filter medium.

4. The sedimentation tank system of claim 2, wherein the control part controls one filtration tank in the filtration part to backwash the filter medium using sewage and wastewater from which solids have been removed.

5. The sedimentation tank system of claim 4, further comprising a sludge thickening tank which receives backwashing water that has backwashed the filter medium, and which filters out solids in the backwashing water through sedimentation thereof.

6. The sedimentation tank system of claim 4, wherein the control part varies the filtration tank performing backwashing in the filtration part according to time or loss of head.

7. The sedimentation tank system of claim 2, wherein the load amount of the sewage and wastewater refers to a flow rate of sewage and wastewater flowing into the sedimentation tank or a concentration of contaminants in sewage and wastewater flowing into the sedimentation tank.

8. The sedimentation tank system of claim 2, wherein the control part closes the water gate when the load amount of sewage and wastewater is equal to or less than a first upper limit value.

9. The sedimentation tank system of claim 2, wherein the control part opens the water gate to store sewage and wastewater flowing into the sedimentation tank when the load amount of the sewage and wastewater exceeds a first upper limit value and is less than or equal to a second upper limit value.

10. The sedimentation tank system of claim 9, wherein the sewage and wastewater stored in the sedimentation tank flows into the pump station from the sedimentation tank along the flow rate adjustment pipe when a water level of the sewage and wastewater in the pump station is lowered.

11. The sedimentation tank system of claim 2, wherein when the load amount of the sewage and wastewater exceeds a second upper limit value, the control part opens the water gate and shuts off the flow rate adjustment pipe so that the sewage and wastewater flow into a sedimentation pond.

12. The sedimentation tank system of claim 11, wherein the sedimentation pond stores introduced sewage and wastewater, separates solids and upper water, and discharges only the upper water.

* * * * *